United States Patent [19]
Gold et al.

[11] 3,904,294
[45] Sept. 9, 1975

[54] AUTOMATIC LENS TESTING APPARATUS

[75] Inventors: Nathan Gold, Framingham; William T. Plummer, Concord, both of Mass.

[73] Assignee: Polaroid Corporation, Cambridge, Mass.

[22] Filed: Dec. 28, 1973

[21] Appl. No.: 429,144

[52] U.S. Cl. ............................................. 356/124
[51] Int. Cl. ............................................. G01b 9/00
[58] Field of Search .......... 356/124, 125, 126, 127; 350/162 SF

[56] References Cited
UNITED STATES PATENTS

| | | | |
|---|---|---|---|
| 3,008,577 | 11/1961 | Miles | 356/125 |
| 3,447,874 | 6/1969 | Bach | 357/124 |
| 3,489,497 | 1/1970 | Bigelmaier et al. | 356/124 |

Primary Examiner—Ronald J. Stern
Assistant Examiner—Conrad Clark
Attorney, Agent, or Firm—Frederick H. Brustamn; John W. Ericson

[57] ABSTRACT

This invention relates to a method and apparatus for acceptance testing of photographic objective lenses. It includes evaluating the lenses' optical performance at several representative locations in the focal plane. The apparatus incorporates certain features that simplify the signal processing necessary to determine whether a specific objective lens is acceptable or not.

37 Claims, 10 Drawing Figures

AUTOMATIC LENS TESTING APPARATUS

BACKGROUND OF THE INVENTION

The present invention relates to acceptance testing large quantities of photographic objective lenses to assure that each unit meets certain image quality standards. It provides a means for individually examining all the lenses in a large batch and sorting out any unsatisfactory ones in an otherwise acceptable batch. An apparatus for this purpose only has to decide if each lens is acceptable or unacceptable. It need not analyze why rejected lenses are unacceptable. However, the apparatus described below generates information that can be analyzed to determine if unacceptableness in a specific case stems from certain causes.

A photographic objective is one part of a whole system that includes a camera, a photosensitive film unit and the viewer's eye. The system might also include photoreproduction equipment and a viewing arrangement. The apparatus described below was invented for acceptance testing of the objective lens in the SX-70 Polaroid Land Camera. That lens is described in U.S. Pat. No. 3,695,750. Those skilled in the art will understand that the concepts taught herein are equally applicable to acceptance testing of catoptric and catadioptric objectives as well as dioptric objectives and the use of the term lens herein, especially as it refers to the article being tested includes within its ambit all of the foregoing.

In determining acceptance criteria for the lens it can be assumed that the camera and the film print system do not limit the photographer's subjective impression of the quality in a hand held print. The performance of the objective lens need only be evaluated with reference to the eye's ability to resolve detail in the hand held print.

While this criterion will be different from the criterion required of a lens designed for another application, e.g., 35mm photography, those skilled in the art will appreciate from the following description how to determine criteria for acceptance testing of other lens designs and use them with the invention disclosed herein.

Studies indicate that for the purpose of visually evaluating or just looking at photographic prints the human eye will derive most of its information or "sense" of the print from the contrast of the detail found in the range of one-half to two line pairs per millimeter. A line pair is a standard target image consisting of two adjacent strips of equal width, one dark, the other bright. An observer will perceive detail if there is a difference in brightness between its dark and light components. This difference is most conveniently expressed as a contrast ratio, i.e. the ratio of their brightnesses. A contrast ratio of ten percent is adequate for visual purposes.

The eye's visual response (contrast transfer) peaks at a spatial frequency of about one line pair per millimeter. Therefore one can reasonably conclude that most of the information visually perceived on a photographic print is at spatial frequencies around one line pair per millimeter. Thus, for photographic lenses intended to form direct print images, such as those used in Polaroid Land Cameras, the optimum design maximizes the lens' contrast transfer efficiency at low spatial frequencies.

The contrast transfer efficiency of the lens at the coarse spatial frequencies resolvable by the unaided eye is a more relevant measure of the objective lens' quality for direct print photography than is the maximum spatial frequency resolvable in an image formed by the lens. The latter, though important in certain applications, is only an indirect way of evaluating the former.

U.S. Pat. No. 3,695,750 describes an objective lens that is manufactured in large numbers. The apparatus described below as the preferred embodiment, was developed specifically for testing this objective lens. To enhance the understanding and appreciation of the invention, some knowledge of that lens is useful.

The contrast transfer values of the objective lens described in the aforementioned U.S. Pat. No. 3,695,750 are quite high at the low spatial frequencies from which the eye will get most of its information about a hand held photoprint. Its high contrast transfer values of 90 to 100 percent for those low spatial frequencies would require extremely accurate contrast measurements to differentiate between test lenses of varying quality. At relatively higher spatial frequencies (e.g. 20 line pairs per millimeter) its change of contrast transfer efficiency with image displacement from its nominal focal plane (defocus) is quite strong. However, spurious resolution gives rise to distinctly non-linear relations between contrast transfer and image displacement within the depth-of-field of interest. The non-linearity would unnecessarily complicate the operation of an acceptance testing apparatus for evaluating the test lenses. Evaluating the test lenses at 7½ line pairs per millimeter is a desirable compromise.

Evaluating the test lenses on the basis of their optical performance at a single spatial frequency greatly simplifies the optical, mechanical and electronic design of the acceptance testing apparatus and its signal processing system. The spatial frequency of 7½ line pairs per millimeter provides a large range of contrast transfer values through the depth of focus region of interest (+ 1.0mm to − 1.0mm). A strong correlation exists between the relative contrast transfer values measured at 7½ line pairs per millimeter and those measured at spatial frequencies around 1.0 line pairs per millimeter. A further benefit from measuring the higher spatial frequency is the assurance that enlargements made from an original print will also appear sharp to the unaided eye. In an enlargement the important spatial frequencies are the ones that are two to eight line pairs per millimeter in the original print.

The analysis herein, leading to the selection of 7½ line pairs per millimeter as the operating spatial frequency of the acceptance testing apparatus, is predicated on the use of the apparatus for testing lenses of the design described in the aforementioned U.S. Pat. No. 3,695,750. Those skilled in the art will now understand how to analyze a different objective lens to determine the optimum spatial frequency or frequencies for testing it.

It is well known that lenses of different quality can produce reasonably good images at their best focus adjustment. Lenses of poor quality yield degraded images at focal positions only slightly displaced from the best focus position, while lenses of good quality yield acceptable images over a range of locations displaced above and below the best focus position. A comparison of images correlated with other than the best focus adjustment allows the easy detection and quantification of differences in objective lens performance.

It has been empirically determined that objective lenses which have a circle of least confusion much greater than 0.12mm yield direct photographic prints that appear fuzzy to the unaided eye. The circle of least confusion refers to the best image formed by a lens of a point light source. It is also referred to as the blur circle. A circle of least confusion, or blur circle, less than 0.12mm results in direct photographic prints that appear sharp to the unaided eye.

Assuming perfect image formation of a point light source by an objective lens with an f/8 aperture, from purely geometric considerations, the blur circle is about 0.12mm or less for a distance of about 1.0mm on each side of the best (geometric) focus. From this one can conclude that an acceptance testing method and apparatus should only be concerned with evaluating the image structure produced by the test lens through a region less than 2.0mm in depth centered on the best focus.

Not all the factors involved in constructing an objective lens have an appreciable effect on its depth of focus. Certain parameters associated with the manufacture and assembly of the various elements and parts of an objective lens seldom vary from acceptable tolerances. The most common manufacturing variables having a relationship to an objective lens' optical performance are those associated with the mounting and centering of the elements within the lens cell. Such defects may cause the plane of best focus to become warped or tilted with respect to the lens' optic axis. They become evident through variations in relative image quality throughout the field from established values.

Certain lens defects such as distortion, spherical aberration and chromatic aberrations vary little, if at all, during manufacturing. The deleterious effects of incorrectly made lens elements and cells are evident as a general image degradation and an increase of field curvature, before any specific defects are evident. Therefore, it is not necessary to evaluate a lens for specific defects to determine its acceptability, and it is undesirable to do so in order to simplify the acceptance testing method and apparatus.

From the foregoing it will now be clear that an acceptance test method and an apparatus to carry out the method need only be concerned with three criteria: the contrast transfer efficiency for certain spatial frequencies; the change in image quality as the lens is defocused; and relative image quality across the field.

OBJECTS OF THE INVENTION

An object of the invention is a suitable method for reliably testing an objective lens for acceptable photographic quality.

Another object of the invention is a method for evaluating an objective lens as a quantitative function of its contrast transfer efficiency at several positions across its image plane.

Yet another object of the invention is a testing apparatus to measure the contrast transfer efficiency of a lens for a particular spatial frequency at several positions in and near its plane of best focus.

Yet another object of the invention is a testing apparatus for evaluating an objective lens on the basis of its contrast transfer efficiency as a function of focal plane displacement from the position of best focus for a plurality of locations distributed through the focal plane's area.

Still another object of the invention is a signal processing system for automatically evaluating an objective lens on the basis of the data generated from the measurements made by the testing apparatus.

Those and still other objects are achieved by the invention described herein.

SUMMARY OF THE INVENTION

The method for carrying out the invention includes: illuminating a plurality of targets having a specific contrast ratio to a certain illumination level; transmitting images of the targets through a lens under test along several different optical paths (channels) toward the lens' focal plane; changing the focus of the lens so its focal plane shifts through its plane of best focus; measuring, as the focus changes, the contrast transfer value of the lens for each optical path (channel) by sampling the targets' images with tiny apertures at the plane of best focus so that light transmitted beyond the plane of best focus is a function of the lens' contrast transfer value for each optical path (channel) and then receiving the light on a photodetector; generating signals from said photodetector containing information about the contrast transfer value of the lens along each optical path (channel); servoing the photodetector and the illumination source together so the time average of the signals generated by the photodetector remains steady; separating the signal associated with each optical path (channel) from the other signals generated by the photodetector; and evaluating the information provided by the signals associated with each channel; and determining the acceptability of the lens therefrom.

The apparatus for carrying out the foregoing method of acceptance testing of objective lens includes an optical portion, a transfer mechanism to move lenses through the optical portion and a signal processing portion. The latter is operatively associated with the optical portion and the transfer mechanism so it can evaluate each lens by the signals it generates in the optical portion and can instruct the transfer mechanism as to each lens' disposition in accord with the evaluation.

The optical portion interfaces with the transfer mechanism through a lens holder that positions each test lens at its test station. It includes means for multiplexing a plurality of different optical paths (channels) through the test lens. Multiplex, as used herein, means to arrange a plurality of optical paths, each capable of conveying an image, so the images can course through a test lens in different directions simultaneously. Each optical path (channel) includes a slotted chopper wheel as a target and a target lens on the object side of the test lens. The target lens controls the apparent optical distance of the chopper wheel from the test lens. An image plate at the focal plane of the test lens contains a slit for each channel. Each slit samples the target image transmitted by the test lens along the corresponding optical path.

The slotted chopper wheels all have the same slot dimensions and separation and the magnification along each optical path (channel) through the test lens is nominally the same. Thus, the spatial test frequency is the same for all the optical paths (channels). The size of the slit in the image plate is equal to the theoretical size of the slot image at the image plate due to the coaction of the target lens and the test lens.

A single light source illuminates all the chopper wheels and a single photodetector receives all the light transmitted by the slits in the image plate. A condensing lens between the photodetector and image plate collects the light passing through all the slits and distributes it across the photosensitive surface of the detector. To simplify the signal processor a servo system is used to control the photodetector. It functions to keep the average value of the signals generated in the photodetector the same, thereby nullifying any effects do to changes in the optical portion or electronic portion of the apparatus, e.g., ageing of the light source.

The multiplexing of the optical paths (channels) from the light source through the test lens to the photodetector requires a means for sorting the resulting signals generated by the photodetector. Rotating the slotted chopper wheels at different speeds provides the necessary means. It causes the photodetector to generate a plurality of sinusoidal signals, each with a different temporal frequency that identifies it as to which optical path it represents.

Part of the signal processing means separates each signal from the conglomerate of signals generated by the photodetector. Another part of the signal processing means evaluates the signal from each channel (optical path) for a minimum peak signal level and it also determines if all the signals exceed a certain value, simultaneously, correlated to a minimum shift of the test lens' focal plane relative to the image plate.

The acceptance standard normally utilized by the testing apparatus and signal processor for evaluating the image quality of a test lens is that all the channels (optical paths) must indicate at least 40 percent contrast transfer, for a spatial frequency of 7½ line pairs/mm, over a 1 mm depth of focus, and that each channel must at some point achieve a minimum peak contrast transfer efficiency of 60 percent for that spatial frequency. This acceptance standard was developed through a series of analytical correlation studies.

DESCRIPTION OF THE DRAWINGS

For a fuller understanding of the nature and objects of the invention, reference should be had to the following detailed description taken in connection with the accompanying drawings, wherein:

FIGS. 4a, 4b and 4c show details of the optical portion;

THE PREFERRED EMBODIMENT

Figure 3:
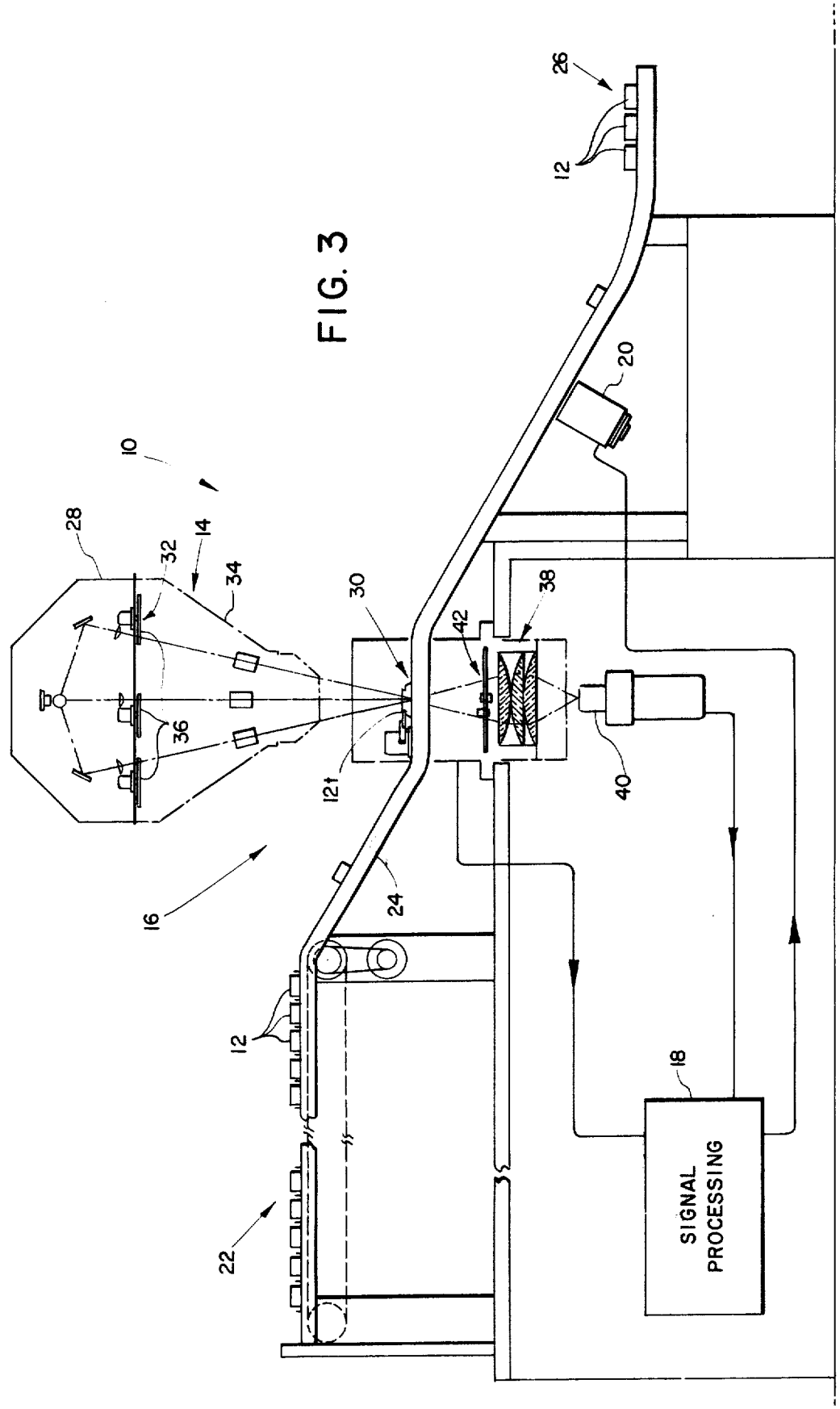
FIG. 3 illustrates the acceptance testing apparatus.

Reference should be made to FIG. 3 wherein an apparatus 10 for acceptance testing of lenses 12 is shown. The acceptance testing apparatus 10 includes: an optical portion 14 for testing the lenses; a transfer mechanism 16 for moving lenses through the acceptance testing apparatus 10; a signal processor 18 for evaluating the information generated by the optical portion 14; and an ejector 20 for removing unacceptable lenses from the transfer mechanism 16.

The transfer mechanism 16 has a first storage area 22 where batches of test lens 12 can be loaded into the acceptance testing apparatus 10. A conveyor 24 withdraws a lens 12 from the storage area 22 and feeds it into a test station 30 within the optical portion 12. It removes the lens 12 from the optical portion 14 after it's tested and transfers the lens 12 past the ejector 20 to another storage area 26. Accepted lenses 12 accumulate in the storage area 26 until they are removed. The ejector 20 redirects any unacceptable lens to an accumulating area (not shown). Thus, only acceptable lenses 12 reach the storage area 26. A rotary index device or other means can also be used for transferring the lenses 12 to the various stations of the acceptance testing apparatus 10.

The objective lens 12 actually undergoing testing at the test station 30 is designated 12t herein.

The optical portion 14 straddles the transfer mechanism 16. It comprises a light house 28 situated above the test station 30. The light house 28 provides illumination for the acceptance testing procedure. The test station 30 receives and manipulates each lens 12 in a controlled manner as required for the acceptance testing procedure. Between the test station 30 and the light house 28 are a target field 32 and a target lens section 34.

The target field 32 is adjacent to the light house 28 and includes a plurality of rotating chopper wheels 36 arranged in a predetermined pattern.

The target lens section 34 has at least one, but preferably several, target lenses for the purpose of setting the optical path distance between the target field 32 and the lens 12t at the test station 30. The use of several target lenses, instead of one, to cover the whole field of view allows the use of simpler target lenses. The use of a target lens section 34 permits the use of an optical path distance greater than the actual distance and results in a more compact acceptance testing apparatus 10. The optical path distance effected by the target lenses 34 corresponds to the optimum object distance.

Beneath the test station 30 a condensing lens 38 images the exit pupil of the lens 12t, held in the test station 30, onto a photomultiplier 40's photosensitive surface.

An image plate 42 at the focal plane of the lens 12t restricts the passage of light to the photomultiplier 40. It contains a plurality of slits that will pass light to the photomultiplier. They sample the image of the target field 32 formed on the image plate 42 by the test lens 12t (the particular one of the objective lenses 12 within the test station 30). Because of the sampling by the slits, the fast variation in the amount of light reaching the photomultiplier 40 is an indication of lens 12t's contrast transfer efficiency. Correlated with other information the acceptance testing apparatus 10 generates the contrast transfer efficiency is the basis for accepting, or rejecting, the test lens 12t.

The correlation and evaluation of the information generated by the acceptance testing apparatus 10 is the function of the signal processor 18. It receives information from both the photomultiplier 40 and the test station 30 and operates or, hopefully, does not operate the ejector 20 as required.

Information about the contrast transfer along each of the several optical paths (channels) through the lens 12t is furnished to the signal processor 18 by the photomultiplier. The test station 30 provides information to the signal processor, about the depth of focus it has adjusted the test lens 12t through. The objective lenses 12 focuses by changing the air separation between the front element and the other elements. This is achieved in practice by joining the former to the latter by means of screw threads so rotating the front element relative to the others will change the separation proportionally. The test station 30, or an additional test station, can also furnish information about the torque required to focus the test lens 12t.

Figure 4:
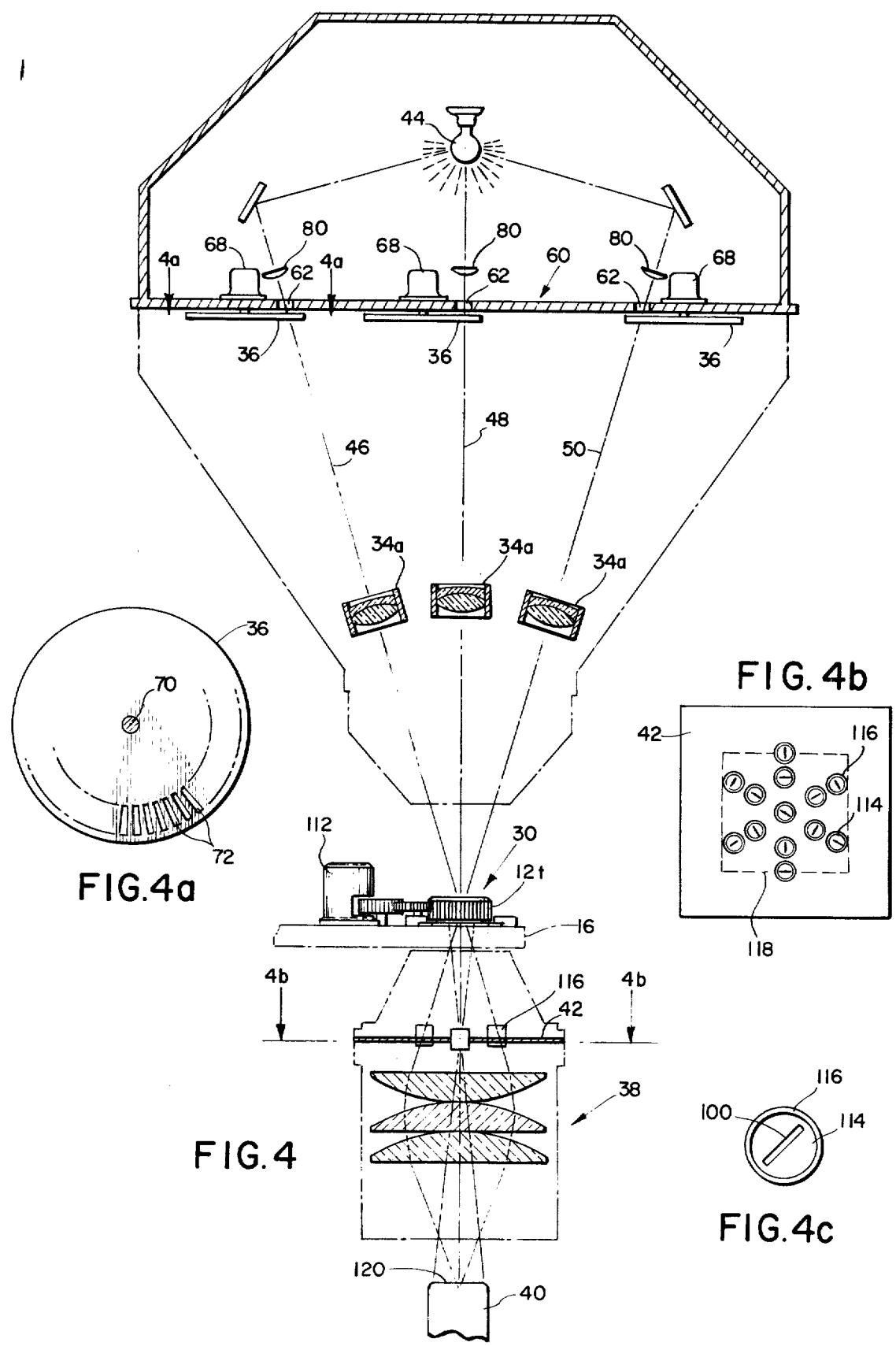
FIG. 4 illustrates in greater detail the optical portion of the acceptance testing apparatus shown in FIG. 3.

The optical portion 14 of the acceptance testing apparatus 10 is shown in greater detail by FIG. 4. A single light bulb 44 illuminates the plurality of optical paths (channels) through the test lens 12t by means of a plurality of mirrors. Mirrors distribute the light to each optical path (channel). Some optical paths (channels) may be illuminated directly, without a mirror. FIG. 4 shows three optical paths 46, 48 and 50. Two of them receive light from the lamp 44 via reflections from mirrors 52 or 54. The third (48) is illuminated directly.

Thirteen optical paths (channels) through the test lens are used in the preferred embodiment of the acceptance testing apparatus 10. Just three of them are shown for the sake of clarity. Those skilled in the art will now know how to construct the other ten optical paths (channels). They will know too that other numbers of optical paths (channels) might be appropriate for testing other kinds of lenses according to the present concepts.

The use of a single lamp 44 avoids potential calibration problems between optical paths (channels) in the signal processor 18 due to possible differences between several light bulbs. Any fluctuation in the light bulb 44's brightness effects all the channels equally.

At the bottom of the light house 28 is a support plate 60 on which the elements of the target field are mounted. It has a plurality of windows 62 through itself which define the optical path (channel) directions through the test lens 12t and, of course, allow the light bulb 44 to illuminate a part of each chopper wheel 36. The arrangement of the windows 62 relates to the arrangement of slits shown in FIG. 4b.

Each chopper wheel 36 has the configuration illustrated in FIG. 4a. Near the periphery of the chopper wheel 36 is a plurality of radial slots 72. The slots 72 are uniformly spaced around the periphery and sufficient in number so the width of each radial slot 72 equals its separation from the next radial slot 72. Their length is several times their width to reduce any optical effects on their images due to their ends. The actual spatial frequency of the slots 72 is predetermined so the final image of them formed at the focal plane of the test lens 12t is 7½ line pairs per millimeter, i.e., the actual spatial frequency multiplied by the net magnification attributable to the test lens 12t and the collimating section 34 equal 7½ line pairs per millimeter.

It should be noted that the spatial frequency of the slots at their outer and inner ends will differ somewhat, but the difference is deminimus if the slot 72's length is a small fraction of its mean radial distance from the shaft 70. It can be ignored.

Each chopper wheel 36 is rotated by a motor 68, mounted above the support plate 60 by means of a shaft 70 through the support plate 60. The motors 68 are adjusted so each chopper wheel 36 rotates at a constant rotational speed different from the rotational speed of every other chopper wheel 36.

Above the band of slots 72 in each chopper wheel 36 is a window 62 through the support plate 60. Each window 62 is large enough for the lamp 44 to fully illuminate at least one slot 72 in the band. They are arranged in the specific pattern that establishes the relative directions of the several optical paths 46, 48 and 50 through the test lens 12t. As noted above, it is like the pattern of slits 100 in the image plate 42 shown in FIG. 4b.

Useful sizes for some of the foregoing parts are: a 100 mm diameter for the chopper wheel 36; a one and one-half mm width for the slots 72 near the periphery of the wheel 36; and a 13 mm diameter for the window 62.

Just above each window 62 is a combined condensing lens and filter 80. It serves two functions. As a condensing lens it images the lamp 44 into the entrance pupil of the test 12t and as a filter it adjusts the light transmitted along its respective optical path so it is the same as the light transmitted along the other optical paths through the test lens 12t. The first function of the condensing lens filter 80 enhances the transmission of light through the optical path (channel) and improves the signal level and the signal to noise ratio. The second function adjust the amount of light transmitted along each optical path (channel). It simplifies the signal processor 18 by avoiding interchannel differences in the net signal through each, due to minor differences in transmission, reflectance, etc. of the parts used to construct the several optical paths 46, 48, 50 etc. through the acceptance testing apparatus 10.

The balancing function is achieved, in this instance, by applying a slightly diffusing surface to such of the collimating lens-filters 80 if and as required. The diffusing surface scatters light from the optical path so it will not reach the photomultiplier 40. The diffusion can be applied in proportion to the need as determined during the calibration of the acceptance testing apparatus 10. Other light attenuating techniques are feasible too, and the balancing can also be done electronically in the signal processor 18.

Practical considerations of structural size and available space lead to the use of the target lens section 34 between the test lens 12t and the target field 32. The optimum focal distance for an object in front of the lens 12 is about 45 inches. Constructing the optical portion 14 for a real object distance of 45 inches makes it unduly bulky. Instead, a much shorter distance, 18 inches, is used and a group of target lenses 34a, 34b and 34c are used to provide a virtual image of the target field 32 located at an apparent (optical) distance of 45 inches from the test lens 12t.

Several target lenses are used because each need cover only a small angular part of the target field 32 whereas a single target lens would need cover the whole angular field. Simpler target lenses can be used with the preferred arrangement because of the narrower angular field of each.

Below the target lens section 34 is the test station 30. It receives the test lenses 12t as the transfer mechanism 24 advances them and positions each centrally in the optical portion 14 for viewing the target field 32 and forming an image of the target field 32 onto the image plate 42 located at the nominal best focus plane of the test lens 12t.

The test station 30 includes a gripping mechanism 110 to receive and hold the test lens 12t during its inspection. Also affiliated with it is a focusing mechanism 112 that rotates the front element cell of the test lens 12t to shift its focus. The focusing mechanism 112 includes means, such as a shaft encoder, to provide information to the signal processor 18 about the amount of angular rotation it imparts to the front element cell of the test lens 12t.

The information about the angular rotation correlates to the shift in focus of the test lens 12t during its inspection because the lens 12t focuses by axial movement of its front element relative to the other elements. A screw thread interconnects the front element with the other elements; therefore, focusing is a function of the front elements angular rotation. The information about rotational torque provides a way to evaluate the mechanical ease of focusing the test lens 12t to determine if it is acceptable from that stand point.

The image plate 42 is located beneath the test station 30; nominally it is in the test lens 12t's plane of best focus for the target field 32. The action of the focusing mechanism 112 causes the actual focal plane of the test lens 12t, for the target field 32, to shift through the plane of the image plate 42.

FIG. 4b shows the image plate 42 in a plan view so the arrangement of the slits 100 thereon is clear. Each slit 100 is cut in an individual disc 114 that can slide axially in a sleeve 116 through the image plate 42 (see FIG. 4c). Thus, the vertical relation of each slit 100 with respect to the image plate 42 is changeable.

The vertical adjustability of the slits 100 allows them to be arranged, with respect to the plane of the image plate 42, to fit their location to the calcuated residual field curvature of a perfect test lens 12t. As those skilled in the art will now understand such an arrangement reduces the computational tasks required of the signal processor 18.

Two other features of the image plate 42 are clear from FIG. 4b. Twelve of the slits are arranged in two concentric rings around the thirteenth, which is at the center of the test lens 12t's field on the image plate 42. Alternate slits are radially oriented with respect to the center and the other slits are tangentially oriented with respect to the center.

The two rings represent included field half angles of about 14° and 22° for the test lens 12t, the latter being the outer region of the intended photographic format of the test lens 12t. A dashed line 118 indicates boundary of that format in relation to the slits 100.

It should be understood that the target field 32 and the image plate 42 are constructed and assembled into the optical portion such that the test lens 12t will form an image of a slot 72 parallel to and coincident on the slit 100 with which it is associated.

Beneath the image plate 42 is the condenser lens 38. It images the exit pupil of the test lens 12t onto the photosensitive surface 120 of the photomultiplier 40. This insures that the maximum amount of the light passing through the slits 100 will be collected and uniformly distributed onto the photosensitive surface 120. Thus, the signal through a slit 100 is not spuriously affected by a local sensitivity variation in the photomultiplier 40. It is important to note that all the optical paths (channels) use the same lamp 44 and photomultiplier 40. This eliminates errors due to component differences. It also allows the photomultiplier 40 to be servoed so its DC signal level remains the same without regard to fluctuations in the illuminance of the lamp 44, the sensitivity or gain of the photomultiplier 40, or other factors.

Figure 5:
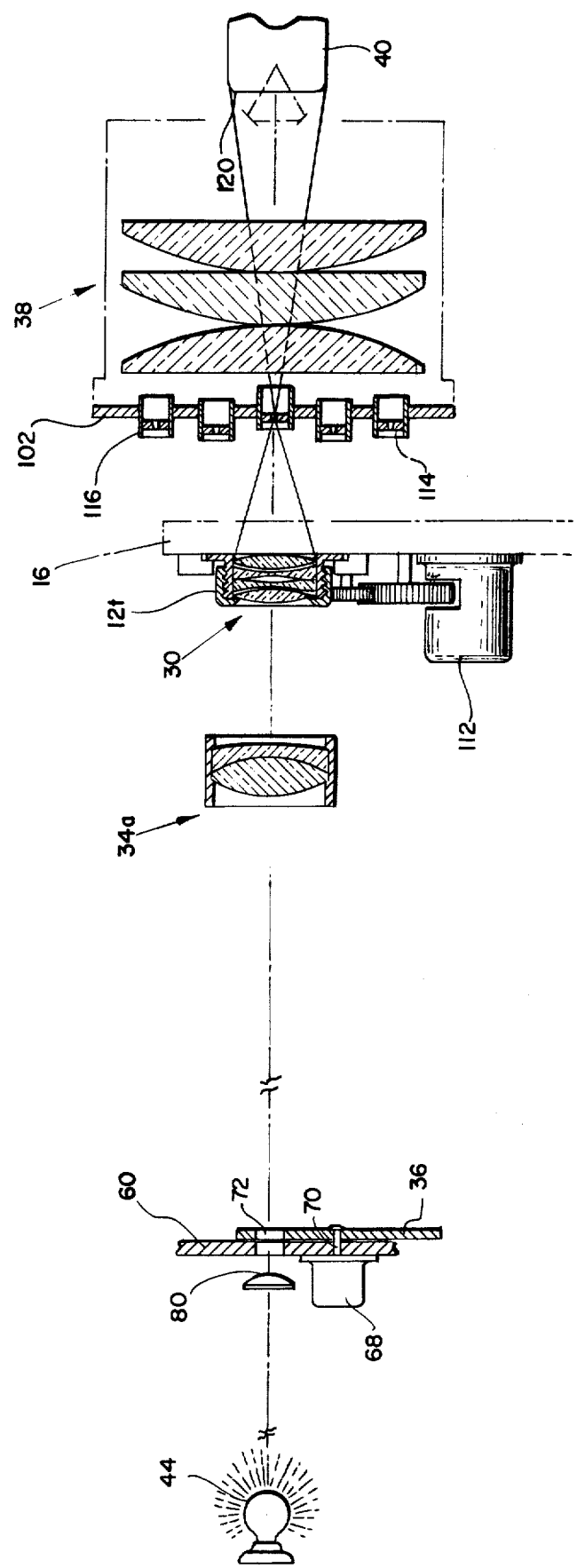
FIG. 5 shows one optical path (channel) through a test lens between the light source and the photomultiplier.

An optical path (channel) between the lamp 44 and the photomultiplier 40 is shown in FIG. 5.

Since a single photomultiplier 40 serves all the optical paths (channels) simultaneously a means must be provided to separate the multiplexed signals. A different temporal frequency is assigned to identify each optical path (channel). Even though the photomultiplier 40 receives light from all 13 optical paths and generates a complex electrical signal representing the sum of all the light incident on it, the individual components of the complex signal can be identified and sorted using electrical signal processing techniques.

The temporal frequency of the photomultiplier's signal for each channel is the combined result of the rotational speed and the number of slots on each wheel. The different temporal signal frequencies are achieved by rotating certain chopper wheels 36 at a predetermined speed different from the predetermined speeds of the other chopper wheels 36 and using different numbers of slots on wheels of proportionate size. Other ways of achieving different temporal signal frequencies are o.k. too. The actual rotational speed and number of slots of each chopper wheel 36 is determined with consideration to the signal processing needs. Numerical values typical of audio frequencies are convenient to use. This technique for achieving different temporal signal frequencies is used because the slots' spatial frequency is established with consideration to the optical acceptance test and it is the same for each optical path (channel).

The operation of the foregoing apparatus results in the simultaneous transmission from the photomultiplier 40 of a plurality of different AC signals in the audio frequency range. Each AC signal stems from the movement of one wheel's slot images past their associated slit.

By intention, the images of the slots and the separators between them are of essentially the same width as the slit they fall on and rotate past. A sinusodial AC signal results. The signal's value is zero at the time the separator's image aligns with the slit 100 and maximum at the time the slot 72's image aligns with the slit 100 if the contrast transfer efficiency of the optical path is perfect. If the contrast transfer efficiency of the optical path is less than perfect, the image will be smeared somewhat, and the signal's lowest value is greater than zero and its peak value less than the maximum.

The brightness of the lamp 44 and the speed of the chopper wheels 36 are controlled so the photomultiplier 40 operates with linear response to image brightness and is independent of temporal frequency.

The optical contrast transfer efficiency of each optical path (channel) is the ratio of the difference between the peak and lowest signal values, to twice the average (DC) signal value.

Those skilled in the art will appreciate that each optical path has its own contrast transfer efficiency apart from the test lens 12t's effect. Thus, the signal from the photomultiplier 40 is the combined result of the contrast transfer efficiency of the test lens 12t and the rest of the optical path. Only the former is of interest. The optical path apart from the test lens 12t should be constructed to have a high contrast transfer efficiency. This enhances the signal to noise ratio and simplifies the signal processor 18. The signal processor 18 can be calibrated to accommodate for the optical path's contrast transfer efficiency.

The use of the same lamp 44 and the same photomultiplier 40 for all the channels omits certain potential sources of complication. Among the problems omitted are channel to channel variations in: brightness; gain; spectral sensitivity and/or color temperature; detector frequency response; and lamp ageing. This simplifies the signal processor 18 and other control features of the optical portion 14.

A further advantage is that with a single lamp 44 and a single photomultiplier 40 it is feasible to use the DC component of the signals from the photomultiplier 40 in a servo loop to compensate for temporal changes in the channels such as ageing of the lamp 44 and thermal drift in the photomultiplier 40. The control means of the signal processing portion 18 achieves this by comparing the DC component of the photomultiplier 40's current to a stable current reference and varying the high voltage supply to the photomultiplier 40 in accord with the comparison's results. This keeps the DC component of the signal constant.

An important result of forcing the DC component of the signal through each channel to remain constant is that the AC (peak-to-peak) component of the signal through each channel is a direct measure of the contrast transfer efficiency of that channel through the test lens 12t.

Figure 6:
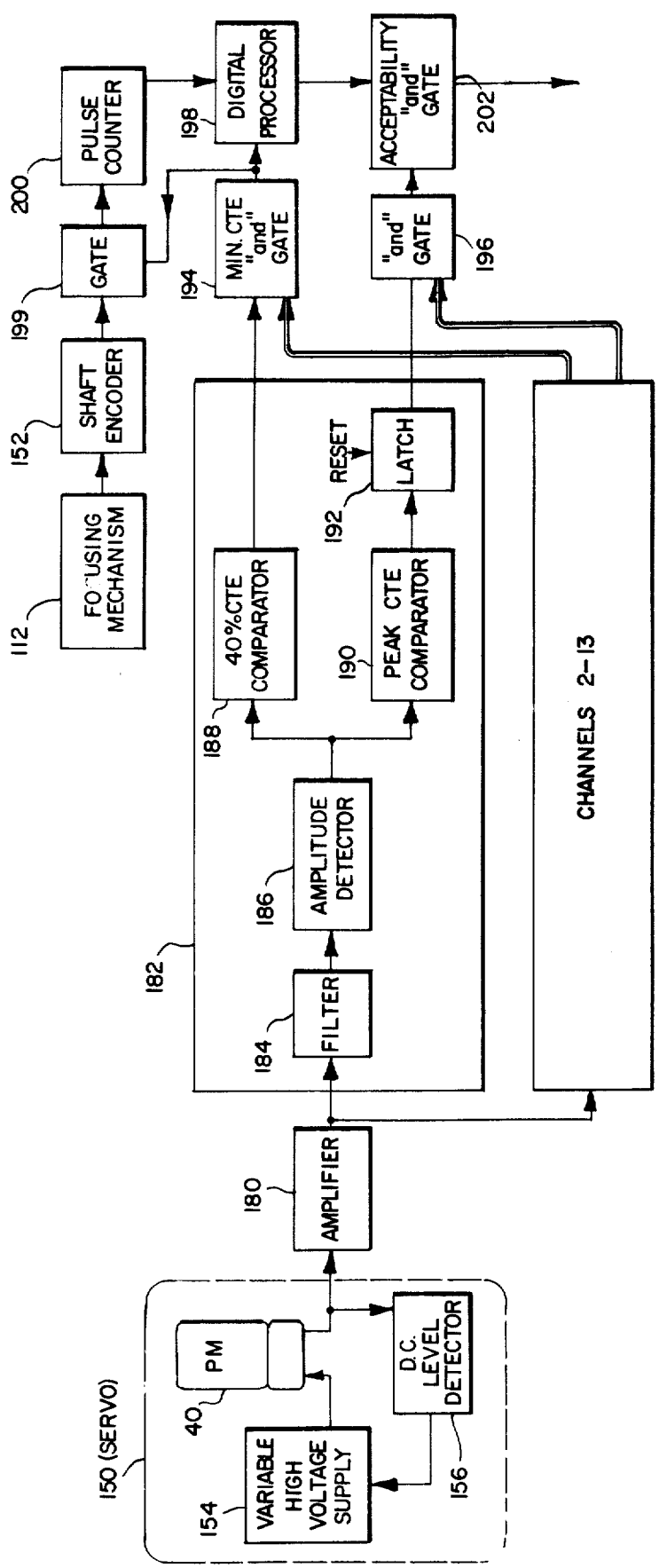
FIG. 6 graphically illustrates some signals generated for a hypothetical test lens.

A better understanding of the control functions and of the signal processor 18 may be had by reference to FIG. 6. It schematically shows the relation between the signal processor 18, the DC controlling servo loop 150 of the photomultiplier 40; and the position encoder 152 of the test station 30.

The DC controlling servo loop 150 includes a variable high voltage supply 154 connected to the photomultiplier 40 and a DC level detector 156 for monitoring the signal from the photomultiplier 40. The DC level detector 156 controls the variable high voltage supply 154 which, in turn, affects the gain of the photomultiplier 40 to keep its DC component of its signal constant.

The signal from the photomultiplier is the sum of the sinusoidal temporal frequency signals generated by each (channel) optical path. It goes to an amplifier 180 and then to a bank of thirteen channel evaluators 182. The number of channel evaluators corresponds to the number of optical paths through the test lens 12t.

Each channel evaluator in the bank 182 comprises a frequency filter 184, an amplitude detector 186, two comparators 188 and 190 and latch 192. The frequency filter 184 is tuned to pass only one of the thirteen temporal frequencies and block the others present in the amplified signal from the photomultiplier 40. The filters in the bank 182 are each tuned to pass a different one of the several temporal frequencies present in the output from the amplifier 180.

The amplitude detector 186 receives the AC signal passed by the frequency filter 184. It converts the AC signal to a DC signal portional to the AC signal's amplitude. The AC signal's amplitude in each channel is proportional to the contrast transfer efficiency of the test lens 12t for that channel's associated optical path. By extension, the DC signal from the amplitude detector 186 is also.

The two comparators 188 and 190 individually use the DC signal from the amplitude detector 186. In the minimum contrast transfer efficiency (CTE) comparator 188 the DC signal is compared to an adjustable reference. The reference is adjusted to equal the DC signal associated with a 40 percent contrast transfer efficiency for that particular channel. If the DC signal equals or exceeds the reference the comparator 188 trips an input of a minimum CTE "and" Gate 194 and it continues to do so as long as it remains above the 40 percent threshold.

In the peak CTE comparator 190 the DC signal is compared to an adjustable reference representing the DC signal associated with a 60 percent contrast transfer efficiency for that channel. If the DC signal equals or exceeds the reference at any time the comparator 190 operates the latch 192 which trips an input of a peak CTE "and" Gate 196. The latch 192 insures that the input to the peak CTE "and" Gate 196 remains tripped even when the DC signal subsequently decreases below 60 percent.

Each channel evaluator in the bank 182 functions in substantially the same manner as channel 1 on behalf of its own channel.

If all channel inputs to the minimum CTE "and" Gate 194 are above threshold the minimum CTE "and" Gate 194 informs a digital processor 198 that it is on. It does so as long as it remains on, i.e., as long as all channels indicate a contrast transfer efficiency of at least 40 percent.

The focusing mechanism 112 which focuses the lens, by rotating its front element, also operates a shaft or position encoder 152. The shaft encoder 152 emits a train of pulses proportional, in number, to the rotation of the front element of the test lens 12t and consequently it is proportional to the shift of the focal plane. A gate 199 controls the flow of pulses to a pulse counter 200. It allows the pulses from the shaft encoder 152 to reach the pulse counter 200 only while all thirteen channels indicate a contrast transfer efficiency of at least 40 percent. That information is provided to it by the minimum CTE "and" Gate 194. The total number of pulses reaching the counter 200 represents the depth of focus for which the contrast transfer efficiency of all the channels is simultaneously at least 40 percent.

The digital processor 198 evaluates the pulse count provided by the pulse counter 200. It trips an input to an acceptability "and" Gate 202 if its evaluation of the pulse count indicates a sufficient depth of focus. In addition to the foregoing function, the digital processor 198 is capable of processing other information available from the optical portion 14 to provide useful information about the test lenses 12t that are examined.

If all thirteen channels' inputs to the peak CTE "and" Gate 196 are tripped it, in turn, trips an input to the acceptability "and" Gate 202. The acceptability "and" Gate 202 has an input for each acceptance criteria just described. It can have additional inputs for other criteria too. Other useful acceptance criteria inputs might represent the test lens 12t's spectral transmission balance, its focusing torque, its light scattering and its focal power.

When all the inputs to the acceptability "and" Gate 202 trip, it accepts the lens under test. If the performance of a test lens 12t is such that one or more inputs to the acceptability "and" Gate 202 fails to trip, it emits a command to the ejector 20 to remove that lens.

After the signal processor 18 evaluates a test lens 12t, it makes and transmits its accept or reject decision and then resets itself in preparation for evaluating the next test lens.

Figure 1:
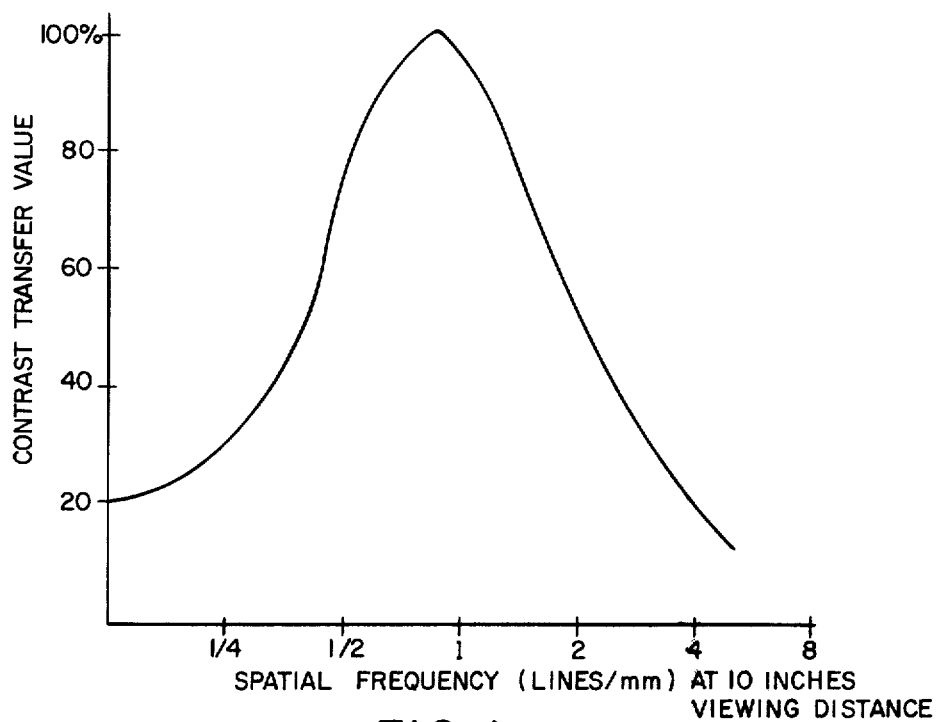
FIG. 1 shows the relevant contrast transfer function of the eye.
Figure 7:
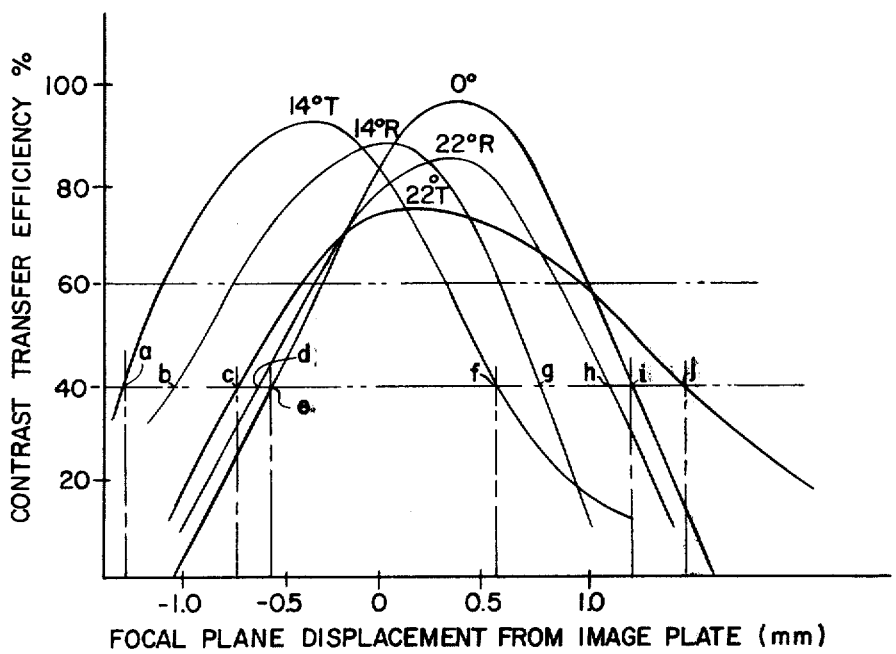
FIG. 7 is a schematic drawing of the signal processor and control means of the acceptance testing apparatus.
Figure 2:
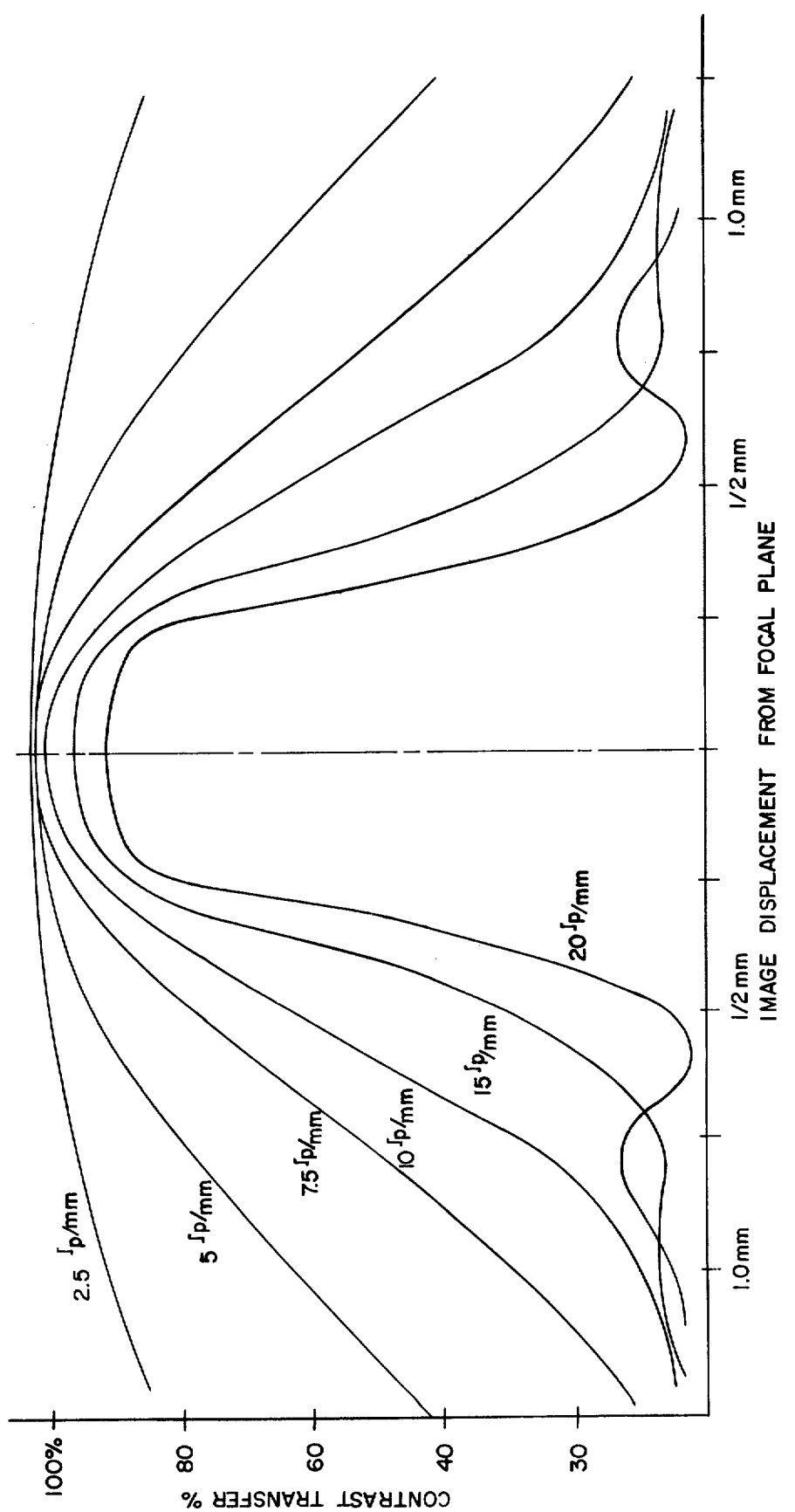
FIG. 2 shows the contrast transfer efficiency of a certain lens for several spatial frequencies.

Reference to FIG. 7 will promote a further understanding of the test method and the interpretation of the data it generates. It is a hypothetical graph of contrast transfer efficiency (in percent) as a function of focal plane displacement for a few selected channels: the axial channel; two channels 14° to the axis, one with a tangential slit (14T) and the other with radial slit (14R); and two channels 22° to the axis, one with a tangential slit (22T) and the other with a radial slit (22R).

The curves on the graph represent the amplitude of the rectified AC signal generated by the designated channels as the test lens 12t is focused to move its best focal plane from beneath the image plate 102 to above it.

The points a through e indicate the image displacement at which each selected channel reaches the threshold of the 40 percent contrast transfer efficiency. The points f through j indicate the image displacement at which the contrast transfer efficiency falls below the 40 percent threshold. One acceptance criterion, described above, is that the amount of displacement separating points e and f, i.e., corresponding to all channels being above the 40 percent threshold, equal a predetermined minimum value. Another criterion for acceptance is that each channel also reaches a contrast transfer efficiency of at least 60 percent at any focal plane displacement. FIG. 7 shows that the selected curves do so.

The field curvature of the hypothetical test lens 12t, represented in the graph of FIG. 7, differs from the theoretical value. One deduces this because the slits 100 in the image plate 102 are displaced to conform with the calculated residual field curvature. The signals for a test lens 12t with such a field curvature should then all peak at the same displacement. It will now also be understood that additional analytical information about each test lens 12t can be extracted from the signals generated by the optical portion 14.

It will be understood that variations and modifications of the invention are possible in light of this disclosure, and it will be apparent to those skilled in the art that various changes in form and arrangement may be made to suit specific requirements without departing from the spirit and scope of the invention. Therefore, it is to be understood that within the scope of the appended claims, the invention may be practiced in a manner than otherwise specifically described herein.

What is claimed is:

1. A multiplexed acceptance testing apparatus for evaluating a test lens, said multiplexed acceptance testing apparatus comprising:
 a test station for releasably positioning said test lens; and
 a plurality of optical paths multiplexed through said test lens each said optical path having an orientation, relative to the optical axis of said test lens, different from the orientation of each other said optical path, each said optical path including, a light source, a test pattern in the field of view of said test lens, means to illuminate said test pattern with light from said source, and means for sampling an image of said target formed by said test lens and for producing a measureable effect that is a function of said test lens' contrast transfer efficiency.

2. A multiplexed acceptance testing apparatus for evaluating a test lens, said multiplexed acceptance testing apparatus comprising:
 a test station for releasably positioning said test lens, said test station including means for adjusting the focus of said test lens and means for generating a signal proportional to the amount of adjustment effected; and
 a plurality of optical paths multiplexed through said test lens each said optical path having an orientation, relative to the optical axis of said test lens, different from the orientation of each other said optical path, each said optical path including, a light source, a test pattern in the field of view of said test lens, means to illuminate said test pattern with light from said source, and means for sampling an image of said target formed by said test lens and for producing a measurable effect that is a function of said test lens' contrast transfer efficiency along said optical path.

3. The multiplexed acceptance testing apparatus described in claim 2 wherein said sampling means includes an opening at the focal plane of said test lens whose shape corresponds to the shape of the best image a perfect test lens would form at said focal plane of said test pattern and wherein each said optical path further includes a photodetector for receiving light from said image passing through said opening.

4. The multiplexed acceptance testing apparatus described in claim 3 wherein each optical path further includes: a target lens for establishing a predetermined effective optical path distance between said test pattern and said test lens; and a condensing lens between said opening and said photodetector for promoting the efficient transfer of light passing through said opening to said photodetector.

5. The multiplexed acceptance testing apparatus described in claim 3 wherein: a single light source serves all of said optical paths by illuminating all of said test patterns; and a single photodetector serves all of said optical paths by receiving the light passing through all of said openings.

6. The multiplexed acceptance testing apparatus described in claim 3 wherein each said test pattern comprises a plurality of mutually aligned slots separated by intervening opaque spaces, said slots and said opaque spaces being of equal width, and wherein each said opening comprises a slit having a width equal to the width of said best image.

7. The multiplexed acceptance testing apparatus described in claim 3 further comprising means for affecting each said optical path so each signal component emitted by said photodetector is identifiable as to which said optical path said signal component relates to.

8. The multiplexed acceptance testing apparatus described in claim 7 further comprising:
 signal processing means for receiving said signal from said test station and said signals from said photodetector and for evaluating them according to predetermined criteria to determine the acceptability of said test lens.

9. The multiplexed acceptance testing apparatus described in claim 8 wherein said signal from said test station and said signals from said photodetector reach said signal processing means simultaneously.

10. The multiplexed acceptance testing apparatus described in claim 3 further comprising:
servo means for maintaining the average signal from said photodetector constant.

11. The multiplexed acceptance testing apparatus described in claim 10, wherein said photodetector is a photomultiplier, further comprising:
a variably high voltage power supply for said photomultiplier and wherein said servo means includes an average DC level detector for monitoring the signals emitted by said photomultiplier and for adjusting said variable high voltage supply in accordance therewith so as to maintain the average DC signal level from said photomultiplier constant.

12. The multiplexed acceptance testing apparatus described in claim 9 wherein said signal processing means includes:
a plurality of channel evaluators, each for evaluating a different one of said plurality of optical paths through said test lens, each having a filter for blocking all signals except those identified for its own channel evaluator, an amplitude detector that receives the signal passed by said filter, a threshold signal level comparator to determine if the peak value of the passed signal's amplitude at least equals a predetermined minimum peak value, and a peak signal level comparator to determine if the amplitude of the passed signal is above a predetermined threshold value.

13. The multiplexed acceptance testing apparatus described in claim 12 wherein said signal processing means further includes:
first "and" gate means for determining if all of said threshold signal level comparators are detecting signals above said threshold value and for transmitting notification when that is the fact;
counter means for receiving said notification and for receiving and evaluating said signal from said test station while said notification continues to be provided;
a processor operatively associated with said counter means and said first "and" gate means for determining if the signal from said test station achieves at least a predetermined minimum value during the period said first "and" gate means is transmitting said notification; and
second "and" gate means for determining and remembering if all of said peak signal level comparators have detected a signal of said predetermined minimum peak value.

14. The multiplexed acceptance testing apparatus described in claim 13 wherein said signal processing means further includes:
means for resetting certain components of said signal processor after it makes its decision about accepting a particular said test lens.

15. The multiplexed acceptance testing apparatus described in claim 2 wherein said means, at said test station, for generating a signal is a shaft encoder.

16. The multiplexed acceptance testing apparatus described in claim 7 wherein: each said test pattern consists of a plurality of alternating radial slots and radial spokes of equal dimensions on a rotatable disk; each said opening comprises a slit having a width and a position coinciding with the width and position of said best image; and each said rotatable disk has a tangential velocity at its said radial slots specific to the optical path it affects, whereby each signal component emitted by said photodetector is identifiable, by its temporal frequency, as to which said optical path it pertains to.

17. The multiplexed acceptance testing apparatus described in claim 4 further comprising:
an image plate, proximate the best focal plane of said test lens, including means for movably positioning each said slit relative to the plane of said image plate whereby said slits may be arranged to conform to the residual field shape calculated for said perfect test lens.

18. The multiplexed acceptance testing apparatus described in claim 2 wherein said plurality of optical paths are arranged in a predetermined relationship so as to sample the performance of said test lens throughout its field of view in both sagittal and tangential directions.

19. The multiplexed acceptance testing apparatus described in claim 3 wherein said openings are slits and wherein said plurality of optical paths are arranged so said slits lie in at least two concentric rings with alternate slits aligned with respect to the center of the focal plane so as to evaluate tengential image quality and with the intervening slits aligned so as to evaluate sagittal image quality.

20. A lens testing apparatus comprising:
test station means for releasably holding a lens;
an image plate situate at the focal plane of said lens held in said test station;
means for changing the focus of said lens relative to said image plate;
a plurality of test patterns disposed in a predetermined pattern within the field of said lens;
a plurality of target slits through said image plate, the arrangement of said plurality of target slits in said image plate corresponding to said predetermined pattern so each target slit receives an image, formed by said lens, of one of said plurality of test patterns;
illuminating means for providing to each of said plurality of test patterns light by which said lens can form the images of said plurality of test patterns at said plurality of target slits; and
detecting means for monitoring the amount of said light that is transmitted through said target slits and for generating a signal containing information about the amount of light transmitted by each target slit.

21. The lens testing apparatus described in claim 20 further comprising:
signal processing means for separating the information, about the amount of said light each of said plurality of target slits transmits, from said signal.

22. The lens testing apparatus described in claim 20 further comprising:
means for providing a predetermined optical distance between said lens and said plurality of test patterns.

23. The lens testing apparatus described in claim 22 wherein said means for providing a predetermined optical distance includes a target lens.

24. The lens testing apparatus described in claim 20 wherein each of said plurality of test patterns includes:
a chopping disk with a plurality of uniform radial slots therein to allow the transmission of light through said chopping disk, each of said uniform radial slots being separated from the next adjacent radial slot in said chopping disk by an opaque spoke approximately equal in width to said radial slot.

25. The lens testing apparatus described in claim 24 wherein each said target slit has a long dimension and a width equal to the width of the image formed thereon by said lens of said radial slots in one of said chopping disks, and a first group of said target slits through said image plate have their length oriented radially, with respect to the center of said focal plane, and a second group of said target slits have their length oriented tangentially with respect to the center of said focal plane.

26. The lens testing apparatus described in claim 25 further comprising:
an opaque mask proximate said test patterns;
a plurality of windows in said opaque mask, each of said windows being substantially smaller than a chopping disk and located in said image plate in association with a particular one of said chopping disks so as to transmit to said focal plane images of said slots in said chopper disks that are approximately parallel to said target slits in said focal plane they fall on.

27. The lens testing apparatus described in claim 26 wherein the spatial frequency of the slots and spokes of each chopping disk are substantially the same.

28. The lens testing apparatus described in claim 20 further comprising:
means for imparting to said light transmitted through each said target slit a temporal frequency different from the temporal frequency imparted to said light transmitted through each other said target slit, whereby said light can be identified as to which said target slit it was transmitted through.

29. The lens testing apparatus described in claim 28, wherein said signal includes DC and AC components, further comprising:
means for servoing said detecting means so as to maintain a predetermined amount of DC signal from said detecting means.

30. The lens testing apparatus described in claim 29 wherein said test patterns are pluralities of radial slots on a rotatable chopping disk and said means for imparting different temporal frequencies causes each test pattern to move with a different velocity from each other said test pattern.

31. The lens testing apparatus described in claim 21 wherein said signal includes DC and AC components, further comprising:
logic means for deciding if the AC signal components associated with each said target slit exceed a first predetermined value and correlating that with the depth of focus of said lens for which said AC signal components exceed said first predetermined value.

32. The lens testing apparatus described in claim 31 further comprising:
means for deciding if each of said AC signal components exceeds a second predetermined value.

33. An apparatus for testing lenses, said apparatus comprising:
collet means for releasably holding a lens to be tested;
a plurality of test targets with a predetermined arrangement in the field of said lens;
an image plate at the focal plane of said lens;
a plurality of target slits in said image plate, said plurality of target slits arranged to each receive an image, formed by said lens, of one of said plurality of test targets, said lens and said pluralities of test targets and target slits aligned with respect to each other to establish a plurality of different optical paths through said lens;
illuminating means;
means for illuminating said plurality of test targets with light from said illuminating means;
means for collecting the light transmitted through said plurality of target slits; and
detector means with a photosensitive surface positioned to receive said light collected from said plurality of target slits, for generating a signal containing information about the contrast transfer efficiency of said lens for each said optical path through it.

34. The apparatus described in claim 33, further comprising:
servo means for operationally controlling said detector means so as to maintain a predetermined amount of DC signal from said detecting means despite changes common to all of said optical paths.

35. The apparatus described in claim 33, further comprising:
means for imparting a different characteristic temporal frequency to the light transmitted by each said optical path; and
signal processing means for sorting the information generated by said detecting means, about the contrast transfer efficiency of said lens for each said optical path through said lens.

36. An apparatus for testing lenses, said apparatus comprising:
collet means for releasably holding a lens to be tested on said apparatus;
an image plate situate at the focal plane of said lens;
a light source in the field of said lens;
detecting means, including a photosensitive surface;
a plurality of angularly separated optical paths through said lens, along each of which said light source can transmit light to said photosensitive surface, each of said optical paths including, a chopping disk on the side of said lens toward said light source and a target slit through said image plate, each said chopping disk having a plurality of radial slots, each slot of a width selected so the width of the image of said slot formed by said lens on said image plate equals the width of said slit;
means for moving each plurality of radial slots at a velocity that is different from the velocity of each other chopping plurality of radial slots;
servo means for operationally controlling said detector means so as to maintain any DC signal from said detector at a predetermined amount.

37. The apparatus described in claim 36, further comprising:
signal processing means for separating the components of said signal attributable to light transmitted along each of said plurality of optical paths.

* * * * *